I. KITSEE.
CABLE TELEGRAPHY.
APPLICATION FILED OCT. 28, 1908.
1,095,329.
Patented May 5, 1914.
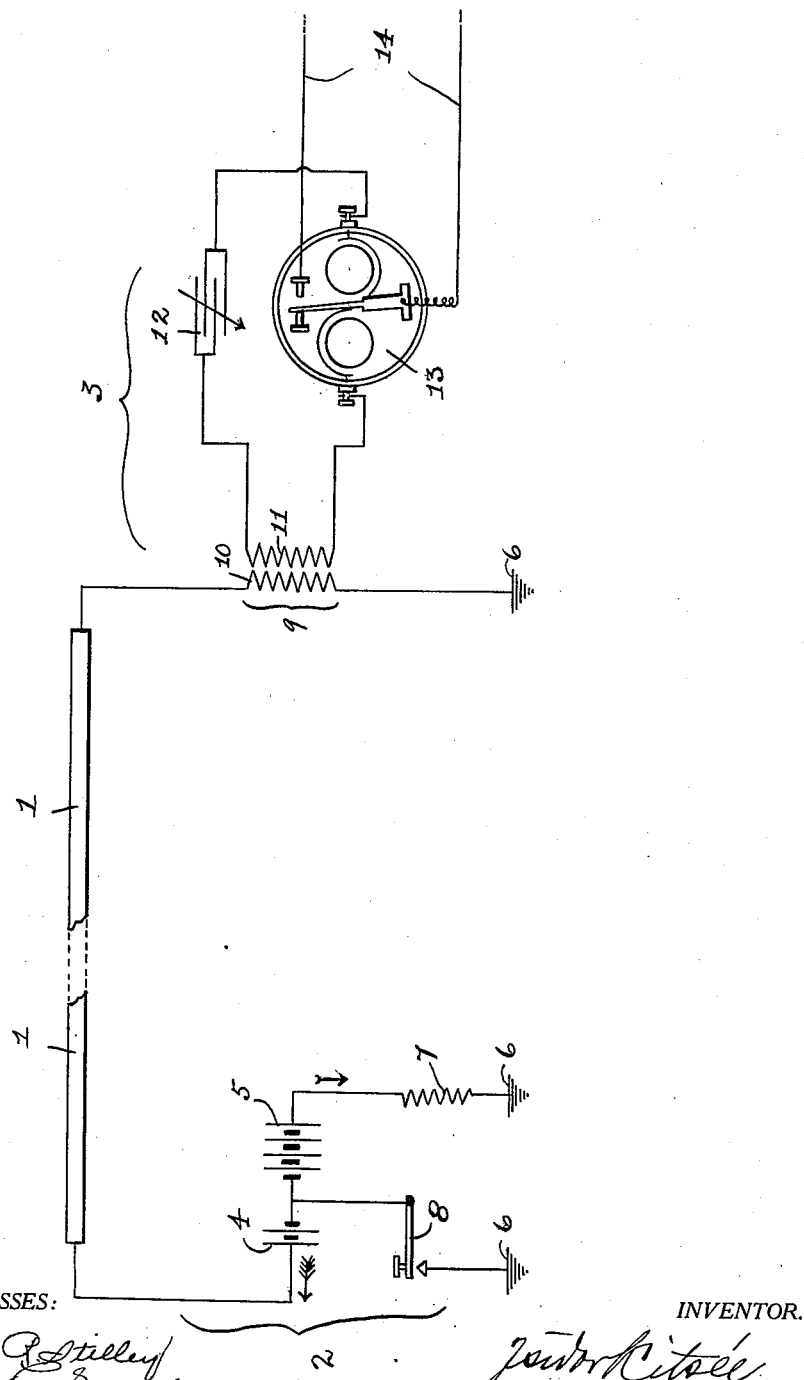
WITNESSES:
INVENTOR.

UNITED STATES PATENT OFFICE.

ISIDOR KITSEE, OF PHILADELPHIA, PENNSYLVANIA, ASSIGNOR, BY MESNE ASSIGNMENTS, TO AMERICAN TELEPHONE AND TELEGRAPH COMPANY, OF NEW YORK, N. Y., A CORPORATION OF NEW YORK.

CABLE TELEGRAPHY.

1,095,329.  Specification of Letters Patent.  Patented May 5, 1914.

Application filed October 28, 1908. Serial No. 459,963.

*To all whom it may concern:*

Be it known that I, ISIDOR KITSEE, citizen of the United States, residing at Philadelphia, in the county of Philadelphia and State of Pennsylvania, have invented certain new and useful Improvements in Cable Telegraphy, of which the following is a specification.

My invention relates to an improvement in cable telegraphy.

The variable state of submarine cables makes the employment of electro-magnetic relays or repeaters with the arrangement of to-day impossible. Submarine cables are subject to fluctuating currents due to the cable itself and are also subject to earth currents fluctuating often in a greater degree than the former. This variable state of the cable makes the employment of condensers at both ends a necessity, but these condensers again give rise to an unstable electrical state, for the reason that it is impossible to arrange matters so as to always charge and discharge the condensers in rhythmic succession. The different charging of these condensers re-acts with different degrees on any of the receiving devices and this gives rise to the well-known "moving of the zero."

In the course of my experiments, covering a period of years, I have tried to reduce the cable, electrically speaking, to the state of a land line, in which nothing else but the resistance of the conductor needs to be taken into consideration. After experimenting with relays of different construction, I had recourse to an arrangement whereby the receiving end is connected to one coil of a transformer and then directly grounded; the second coil of the transformer being locally connected to a translating organism. I discarded all condensers and connected the cable at the transmitting end directly to source of current with the aid of which reversals may be transmitted. I tried transformers of different ratios. The best result obtained by me was with a transformer with closed magnetic circuit; the coil inserted in the cable having a value of about 30,000 ohms and the coil locally to be connected to the translating devices having a value of about 780 ohms.

In some of my tests, a galvanometer inserted directly in the cable showed a deflection of over 50 degrees, fluctuating from the right to left, nothing else being in the cable and the cable being grounded without the interposition of any battery, thus showing that the current waves always present in the cable are in themselves sufficient to actuate a receiving device, notably as delicate an instrument as is required in cable telegraphy.

When I placed the coil of higher value in the cable and connected the galvanometer locally to the coil of lower value, the galvanometer still fluctuated, but did not show more than from one-half to two deflections. Placing in the circuit of the coil of lower value in series with the galvanometer a condenser of three microfarads, the fluctuation ceased entirely. An increase of this capacity to fifty microfarads again gave rise to a slight fluctuation of the needle.

It has to be stated that some of these experiments were made on a cable running from Canso, N. S., to New York, N. Y., a distance of over 900 miles. In receiving impulses from Canso, it was found that these impulses could not be utilized for the operation of a receiving device if only three microfarads are inserted in the transformer circuit. But when the condenser capacity was raised to about five microfarads, the impulses received from Canso were strong enough for all purposes. In one of the experiments, the coil of lower value was inserted in the cable and the coil of higher value connected locally to a condenser with the receiving device; the electro-motive force of the transmitted current being, as usual, 24 volts. The receiver (a siphon recorder) did not answer. After repeated trials with step-up as well as step-down transformers, I came to the conclusion that for practical working a step-down transformer is required to produce good results and that it is best to place in the local circuit an adjustable condenser adapted to be varied in accordance with requirements.

Coming now to the detail of the arrangement, reference is taken to the accompanying drawing which illustrates in diagrammatic view a cable system embodying my invention.

In this drawing; 1, 1, are the two parts of the cable proper; 2 is the transmitting station as an entirety and 3 the receiving station as an entirety. The transmitting station is here illustrated as to consist of the two sets of batteries 4 and 5 placed in series as to the line and in opposition as to each other; the source 5 of higher electromotive force than the source 4. The source 5 is here grounded at 6 with the interposition of the resistance 7. To the junction of the sources 4 and 5 is connected the lever of the key 8 grounded also at 6. The operation of this part of the system is as follows:—Normally, a current will flow from 5 in the direction of the unfeathered arrow over the cable. When the key is closed, the source 5 is short circuited and the current from 4 will flow in the direction of the feathered arrow over the cable and this reversal of the current will actuate the transformer at the receiving station. At the receiving station 3, 9 is the transformer as an entirety, of which 10 is the coil inserted in the cable and 11 the coil connected locally to the translating organism.

As stated above, I have found that it is best to use a step-down transformer and the ratio of about 40 to 1 was found by me to give the best result; this, for the reason that the incoming impulses are only of minute quantity and the quantity has to be increased, the receiving device allowing a decrease in the electro-motive force.

12 is a variable condenser and 13 is the translating device, here shown as an electro-magnetic relay; the armature and one forward stop of same connected to the local circuit 14. In this local circuit, the necessary devices to receive the message by sound, record, or print, can be placed.

Having now described my invention, what I claim as new and desire to secure by Letters Patent is:—

A system of cable telegraphy comprising for the transmitting station two sources of current connected in the line of transmission, but in opposition as to each other; a resistance for one of said sources and a ground connecting one pole of said source with the interposition of said resistance to said ground; a transmitting key; one part of said transmitting key connected to the junction of said two sources; the other part of said transmitting key grounded; and comprising for the receiving station a transformer; one coil connected to the cable and ground, respectively; the second coil connected to a local circuit; a condenser for said local circuit, an electro-magnetic receiver for said local circuit and a local circuit for said electro-magnetic receiver.

In testimony whereof I affix my signature in presence of two witnesses.

ISIDOR KITSEE.

Witnesses:
 EDITH R. STILLEY,
 MARY C. SMITH.

Copies of this patent may be obtained for five cents each, by addressing the "Commissioner of Patents, Washington, D. C."